(12) United States Patent
Ryu et al.

(10) Patent No.: US 7,719,620 B2
(45) Date of Patent: May 18, 2010

(54) HEAT CURING DEVICE AND METHOD OF FABRICATING LIQUID CRYSTAL DISPLAY DEVICE USING THE SAME

(75) Inventors: Jae Choon Ryu, Gumi-si (KR); Chun Ok Park, Gumi-si (KR); Jae Ho Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 912 days.

(21) Appl. No.: 11/472,274

(22) Filed: Jun. 22, 2006

(65) Prior Publication Data
US 2007/0002269 A1    Jan. 4, 2007

(30) Foreign Application Priority Data
Jun. 30, 2005    (KR) ...................... 10-2005-0058274

(51) Int. Cl.
*G02F 1/1339*    (2006.01)
(52) U.S. Cl. .......................................... 349/1; 349/190
(58) Field of Classification Search .................. 349/153, 349/161, 187, 190; 445/24, 25; 430/321; 414/222.01, 222.09, 225.01, 226.03, 226.05; 156/379.6, 380.9, 381, 382
See application file for complete search history.

(56) References Cited

U.S. PATENT DOCUMENTS

| | | | |
|---|---|---|---|
| 5,629,787 A | * | 5/1997 | Tsubota et al. .............. 349/153 |
| 6,646,689 B2 | * | 11/2003 | Matsuda ........................ 349/1 |
| 2002/0063836 A1 | * | 5/2002 | Oku et al. .................... 349/153 |
| 2003/0178134 A1 | * | 9/2003 | Muramoto et al. .......... 156/285 |
| 2004/0001177 A1 | * | 1/2004 | Byun et al. .................. 349/187 |

FOREIGN PATENT DOCUMENTS

| | | |
|---|---|---|
| JP | 10-104564 | 4/1998 |
| JP | 11-052321 | 2/1999 |
| JP | 2002-328381 | 11/2002 |
| JP | 2003-280010 | 10/2003 |

* cited by examiner

*Primary Examiner*—Dung Nguyen
*Assistant Examiner*—Tai Duong
(74) *Attorney, Agent, or Firm*—McKenna Long & Aldridge LLP

(57) ABSTRACT

A heat curing device includes supports positioned in a chamber to support a substrate, the supports having sections, and protrusion structures formed on the sections of the supports to contact a dummy area of the substrate, wherein the supports may be rotated with respect to a horizontal axis. The sections of the supports may have a polygonal structure with the protrusion structures are formed on the polygonal sections of the supports, so that a plurality of protrusion structure patterns can be formed on one support. Since the supports are rotatable, the protrusion structure patterns supporting a substrate may be readily changed.

28 Claims, 10 Drawing Sheets

HEAT CURING DEVICE AND METHOD OF FABRICATING LIQUID CRYSTAL DISPLAY DEVICE USING THE SAME

This application claims the benefit of Korean Patent Application No. P2005-0058274, filed on Jun. 30, 2005, which is hereby incorporated by reference for all purposes as if fully set forth herein.

BACKGROUND OF THE INVENTION

1. Field of the Invention

The present invention relates to a liquid crystal display (LCD) device, and more particularly, to a heat curing device for curing a sealant.

2. Discussion of the Related Art

Among ultra-slim flat panel displays having a display screen whose thickness is merely several centimeters, a liquid crystal display device (LCD) has the advantage of a low operation voltage, resulting in low power consumption, and portability. Accordingly, the LCD can be widely used in a variety of applications, such as notebook computers, monitors, spacecraft and aircraft instrumentation.

Hereinafter, a related art LCD device will be described.

As shown in FIG. 1, the related art LCD device includes a lower substrate 1 and an upper substrate 3 opposing each other. Although not shown, the lower substrate 1 includes a thin film transistor and a pixel electrode, and the upper substrate 3 includes a light-shielding layer, a color filter layer, and a common electrode.

A liquid crystal layer 5 is formed between the substrates 1 and 3. The liquid crystal layer 5 is sealed between the substrates 1 and 3 by a sealant 7 formed between the substrates 1 and 3.

The aforementioned related art LCD device may be fabricated using a liquid crystal injection method or a liquid crystal dropping method.

When the liquid crystal injection method is used, after a lower substrate and an upper substrate have been prepared, a sealant having an injection hole is formed on one of the substrates. After the upper and lower substrates are bonded to each other using the sealant, liquid crystal is injected through the injection hole to form a liquid crystal layer, completing the LCD device.

When the liquid crystal dropping method is used, after a lower substrate and an upper substrate are prepared, a sealant having no injection hole is formed on one of the substrates. A liquid crystal layer is formed by dropping a liquid crystal onto one of the substrates, after which the substrates are bonded to each other, to complete the LCD device.

In the liquid crystal injection method, a relatively long time is required for injecting liquid crystal, particularly when forming large sized LCD cells. Using the liquid crystal dropping method may increase productivity when producing large sized LCD devices.

In both the liquid crystal dropping method and the liquid crystal injection method, substrates are bonded to each other after forming a sealant. A process for curing the sealant may be used with either method for forming the liquid crystal layer.

In the liquid crystal injection method of the related art, a thermosetting sealant is used as the sealant, and a heating process for curing the sealant is used. With the liquid crystal dropping method of the related art, ultraviolet (UV) radiation is used as the primary agent for curing the sealant. However, because of difficulties in achieving a complete cure of the sealant using UV rays, a heat curing process may be carried out along with the UV curing process.

Accordingly, a heating process for curing the sealant may be required with either the liquid crystal injection method or the liquid crystal dropping method. A heat curing device is used to carry out the heat curing process.

FIG. 2 is a sectional view illustrating a related art heat curing device for curing a sealant.

As shown in FIG. 2, a heat curing device of the related art includes a chamber 10 and a support 12 for supporting a substrate 14 in the chamber 10. A plurality of liquid crystal cells are formed at the center of the substrate 14. Active regions of the liquid crystal cells may be damaged if the support 12 is in contact with the center of the substrate 14. In order to prevent the active regions from being damaged, the support 12 is formed to contact the substrate 14 only at the substrate ends.

Large sized substrates are increasingly used in the manufacture of liquid crystal display devices. However, as shown in FIG. 2, when supporting large substrates in the related art curing device, the substrate 14 may sag in the center under its own weight if the support 12 contacts only the ends of the substrate 14.

SUMMARY OF THE INVENTION

Accordingly, the present invention is directed to a heat curing device and a method of fabricating an LCD device using the same that substantially obviates one or more of the problems due to limitations and disadvantages of the related art.

An advantage of the present invention is to provide a heat curing device for curing a sealant, in which sagging of a substrate is avoided without causing damage to an active region of a liquid crystal cell.

Another advantage of the present invention is to provide a heat curing device for curing a sealant that uses reduced process time when changing the size of a liquid crystal cell.

Another advantage of the present invention is to provide a method of fabricating an LCD device using the heat curing device for curing a sealant.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, a heat curing device includes: a plurality of supports positioned to support a substrate, each of the supports rotatable about a horizontal axis; and one or more protrusion structures formed on respective sections on the surface of each support arranged to contact a dummy area of a substrate.

In another aspect of the present invention, a method of fabricating an LCD device, includes: preparing bonding substrates having a plurality of liquid crystal cells and provided with a liquid crystal layer and a sealant; preparing a heat curing device; and curing the sealant after loading the bonding substrates in the heat curing device, wherein the heat curing device includes at least one support positioned to support a substrate, the supports having polygonal sections, and protrusion structures formed on polygonal sections of the supports to contact a dummy area of the substrate, wherein the at least one support is rotatable with respect to a horizontal plane.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
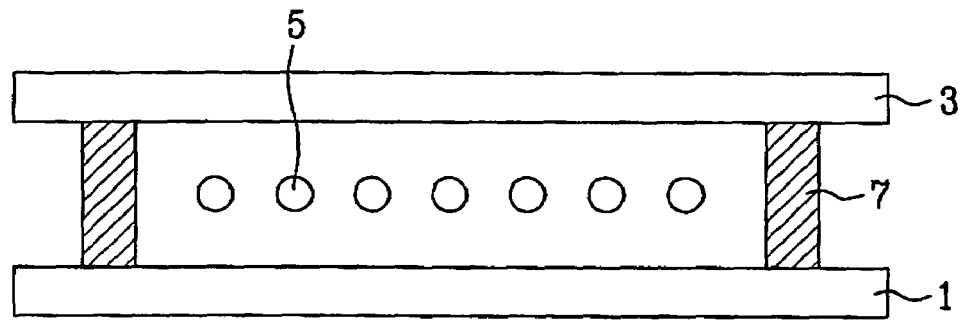
FIG. 1 is a sectional view illustrating a related art LCD device.
Figure 2:
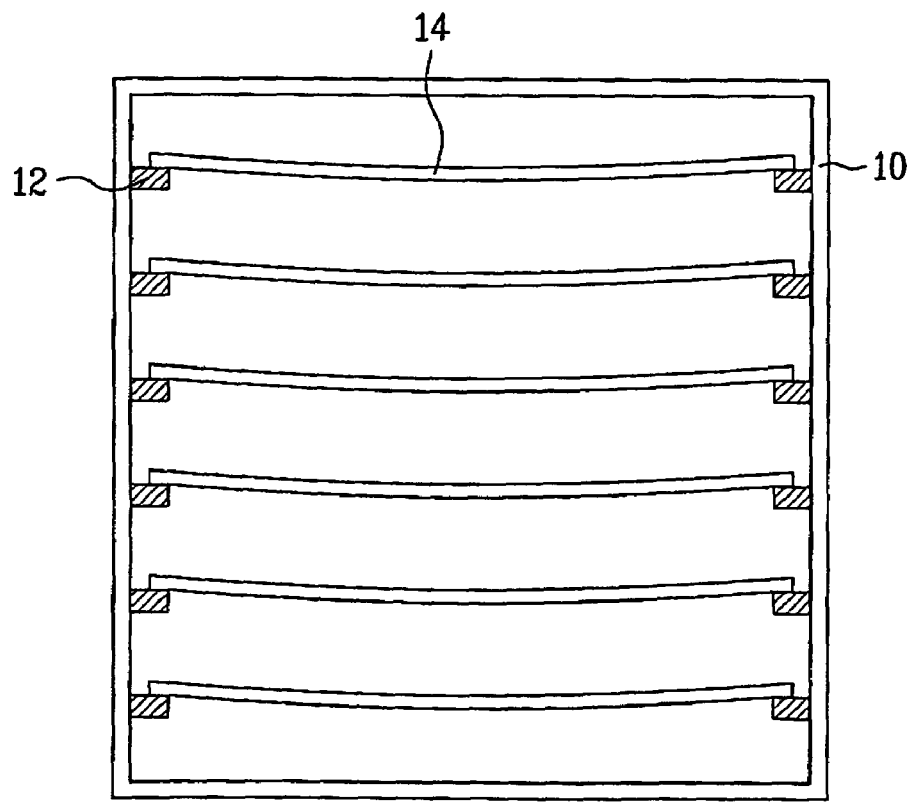
FIG. 2 is a sectional view illustrating a related art heat curing device for curing a sealant.
Figure 3:
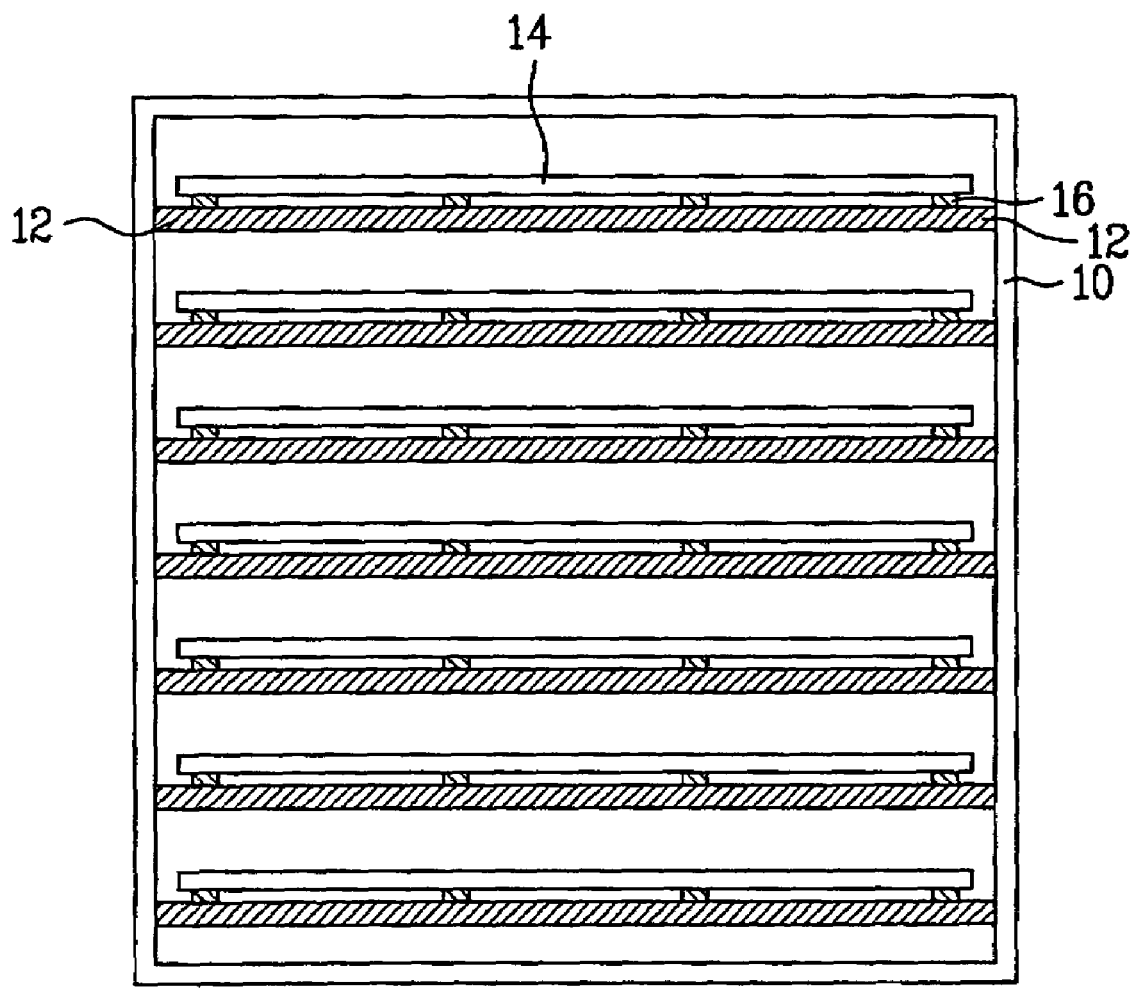
FIG. 3 is a sectional view illustrating a heat curing device for curing a sealant.

As shown in FIG. 3, a heat curing device according to an embodiment of the present invention includes a chamber 10, a support 12 connected to both ends of the chamber 10, and a protrusion 16 formed on the support 12.

Referring to FIG. 3, the protrusion 16 of the heat curing device may be positioned in a dummy area between liquid crystal cells on a substrate 14 by forming the protrusion 16 on the support 12. Supporting the substrate by contact with dummy areas allows preventing the substrate 14 from sagging without causing damage to active regions of liquid crystal cells.

However, the heat curing device shown in FIG. 3 has limitations that adversely affect productivity during the mass production of liquid crystal display devices. When fabricating an LCD device, a plurality of liquid crystal cells is formed on one substrate 14. The liquid crystal cells are formed in various sizes in accordance with a consumer's request. When the size of a liquid crystal cell being manufactured is changed, the location of the dummy area of the liquid crystal cell may also change, requiring a change to the position of the protrusion. Further, the size of the liquid crystal cell may undergo frequent changes, with the position of the support 12 changing accordingly.

Because the heat curing device may be at a high temperature such as 120° C., a standby time may be employed to lower the temperature in the heat curing device to allow the position of the support 12 or a protrusion 16 to be changed. Standby time increases the process time for forming a LCD device.

Hereinafter, additional embodiments of the present invention will be described with reference to the accompanying drawings.

1. Heat Curing Device According to Embodiments of the Invention

Figure 4:
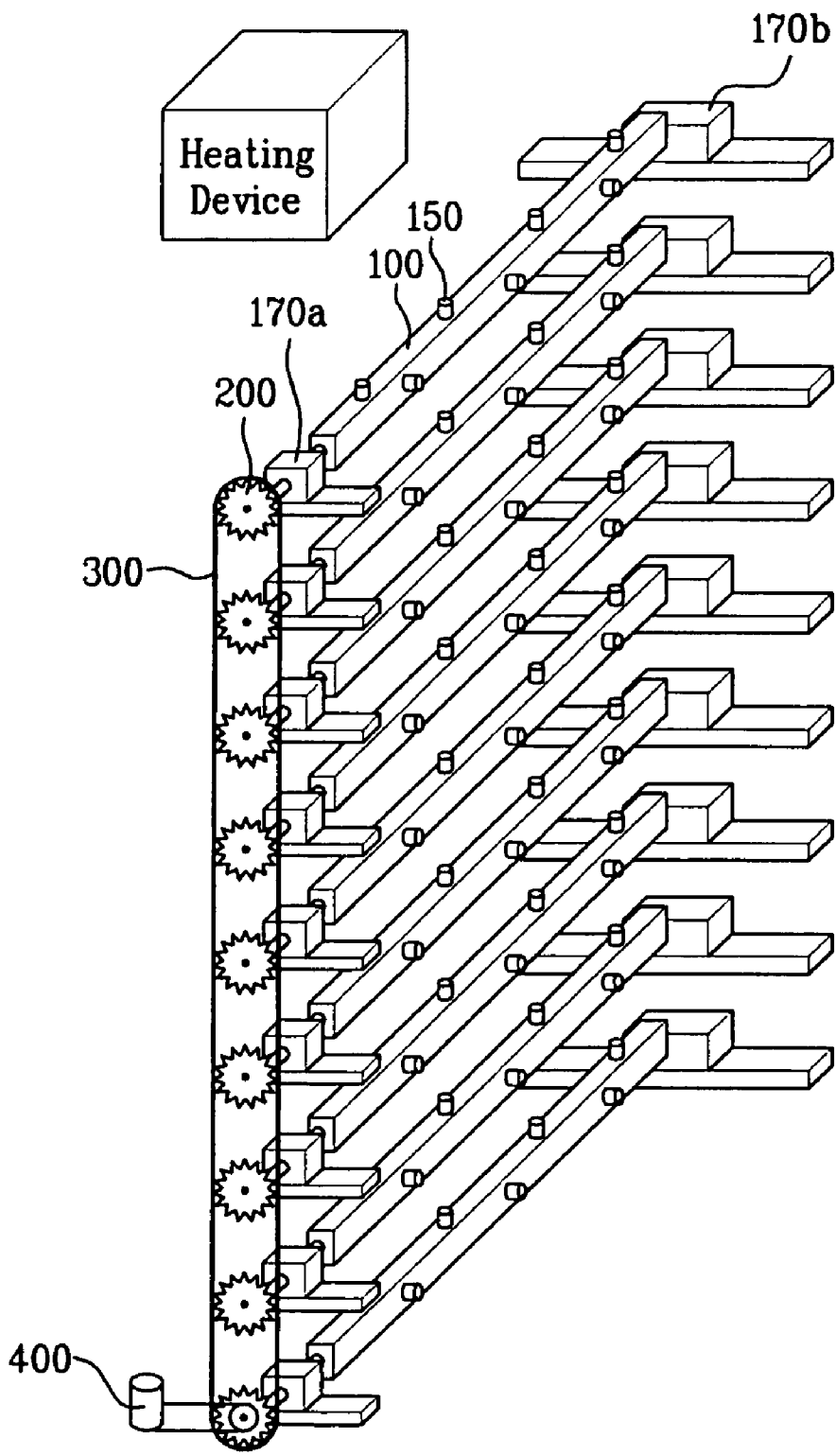
FIG. 4 is a perspective view illustrating a heat curing device according to the first embodiment of the present invention.
Figure 5:
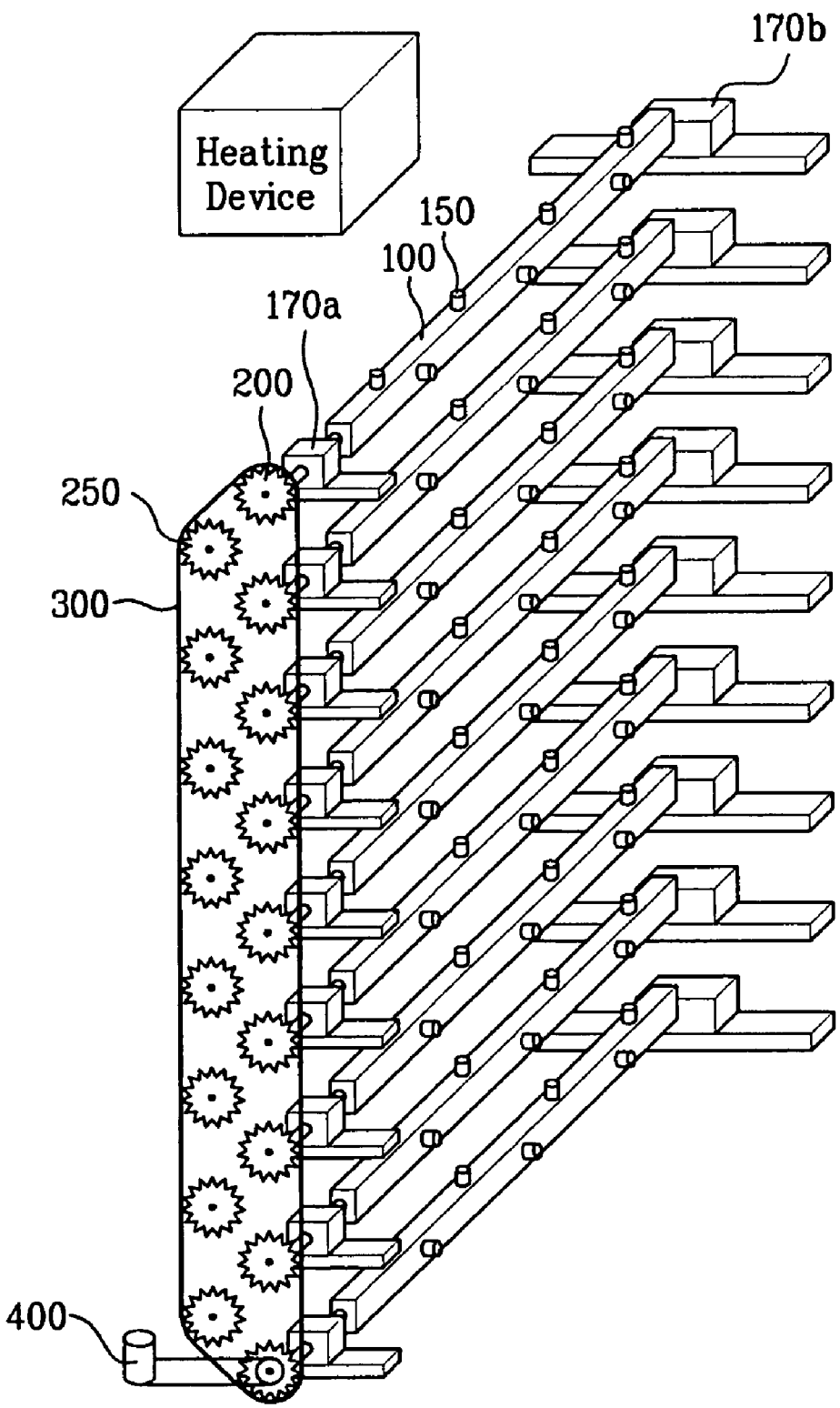
FIG. 5 is a perspective view illustrating a heat curing device according to the second embodiment of the present invention.
Figure 6:
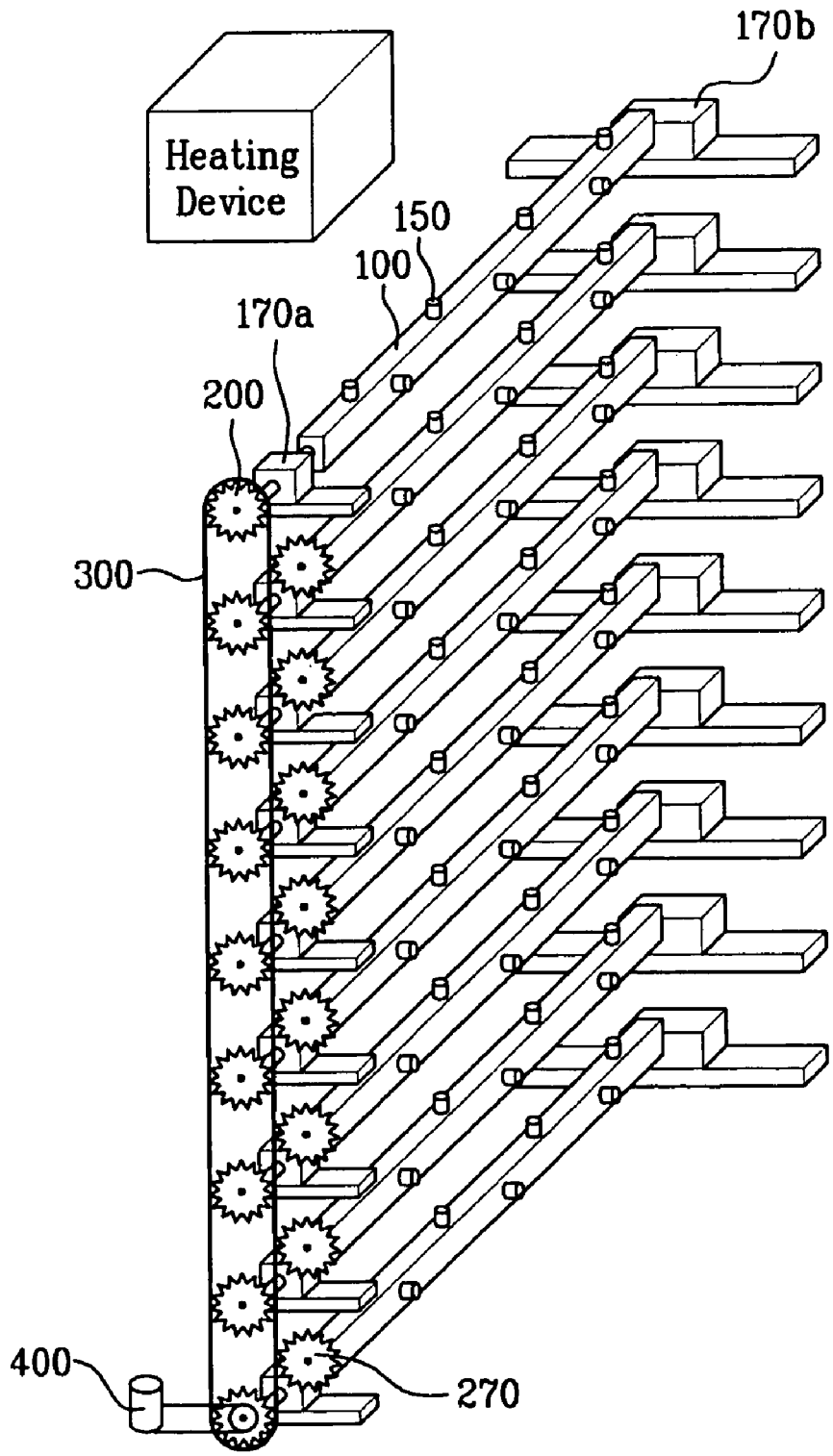
FIG. 6 is a perspective view illustrating a heat curing device according to the third embodiment of the present invention.

FIG. 4 is a perspective view illustrating a heat curing device according to a first embodiment of the present invention, FIG. 5 is a perspective view illustrating a heat curing device according to a second embodiment of the present invention, and FIG. 6 is a perspective view illustrating a heat curing device according to a third embodiment of the present invention.

The heat curing devices according to the embodiments of the present invention shown in FIGS. 4 to 6 simultaneously rotate multi-staged supports using a gear or toothed wheel and a belt.

As shown in FIG. 4, the heat curing device according to the first embodiment of the present invention includes a set of multi-staged supports 100, protrusion structures 150 formed on each support 100, a plurality of toothed wheels or gears 200 respectively connected with the multi-staged supports 100, a belt 300 connected with the gears 200, and a grip 400 connected with at least one of the gears 200.

The supports 100 are positioned in a chamber to support the substrate. The supports 100 are arranged in multiple stages with supports of each multi-stage arranged between the lower portion and the upper portion of the chamber. The ends of each support 100 are respectively supported by a first mechanism 170a and a second mechanism 170b. Although the supports 100 are illustrated as having rectangular shaped sections in the drawings, the sections may have other shapes such as a polygonal shape.

At least two sets of supports 100 may be arranged horizontally in a row to support a substrate. In other words, three or more multi-stages of supports 100 may be arranged in a row depending on the size of the substrate being supported.

The protrusion structures 150 may be formed on polygonal sides of the supports 100, and are arranged in a pattern to contact the dummy areas of the substrate. In other words, when the substrate is positioned on the supports 100, the protrusion structures 150 on a particular section of a support are positioned to contact the dummy areas of liquid crystal cells formed on the substrate to avoid causing damage to the active regions of the liquid crystal cells.

If a support contacts an active area, pressure applied against column spacers formed in the liquid crystal cell to maintain a cell gap by the weight of the substrate may cause a defect or black spot in the cell. By positioning the protrusion structures 150 to contact dummy areas having no column spacers, it is possible to reduce or eliminate creation of such defects.

When the protrusion structures 150 are formed on each of polygonal sections of a support 100, the number of patterns of the protrusion structures 150 is determined in accordance with the number of the polygonal sections of the support 100. The protrusion structures 150 may be formed on fewer than all the polygonal sections of the support 100. However, forming the patterns of protrusion structures 150 on each of the polygonal section of the supports 100 increases the number of patterns of the protrusion structures 150 that can be selected.

The gears 200 are each connected to a respective one of the supports 100. The gears 200 are driven by the belt 300, which engages each of the gears 200. At least one of the gears 200 is connected to the grip 400, which serves as a manual rotating means for rotating the gears 200.

When any one of the gears 200 is rotated by rotation of the grip 400, all of the gears 200 engaged by the belt 300 are rotated. When a gear 200 is rotated, the respective support 100 connected with the gear 200 is rotated. Thus the belt transmits the rotation of a gear 200 rotated by the grip 400, and synchronizes the rotation of the gears and the supports 100. As a result, all of the supports 100 are rotated by rotation of the grip 400, and the pattern of the protrusion structures 150 formed on a polygonal section of the supports 100, and positioned to support a substrate can readily be changed.

The heat curing device may include a chamber receiving the supports 100 provided with the protrusion structures 150, and a heating device for increasing a temperature in the chamber.

The heat curing device according to the second embodiment of the present invention shown in FIG. 5 is the similar to the heat curing device according to the first embodiment of the present invention shown in FIG. 4 but further includes first auxiliary gears 250 engaging the belt 300.

The first auxiliary gears 250 are spaced apart from the gears 200 connected with the supports 100 at a predetermined distance. The distance between the first auxiliary gears 250 and the gears 200 and the number of the first auxiliary gears 250 can be adjusted appropriately to control the rotation of the respective gears 200 in response to rotation of the grip 400.

The heat curing device according to the third embodiment of the present invention shown in FIG. 6 is the similar to the heat curing device according to the first embodiment of the present invention shown in FIG. 4 differing by further including second auxiliary gears 270 connected with the belt 300 on an outside surface of the belt 300.

The second auxiliary gears 270 are positioned to oppose the gears 200 by interposing the belt 300 therebetween, and are formed in regions between the respective gears 200 to control the rotation of the gears 200. The number of the second auxiliary gears 270 can be adjusted appropriately to control the rotation of the respective gears 200 in response to rotation of the grip 400.

Alternatively, both first auxiliary gears 250 and second auxiliary gears 270 may be used together in a heat curing device.

Figure 7:
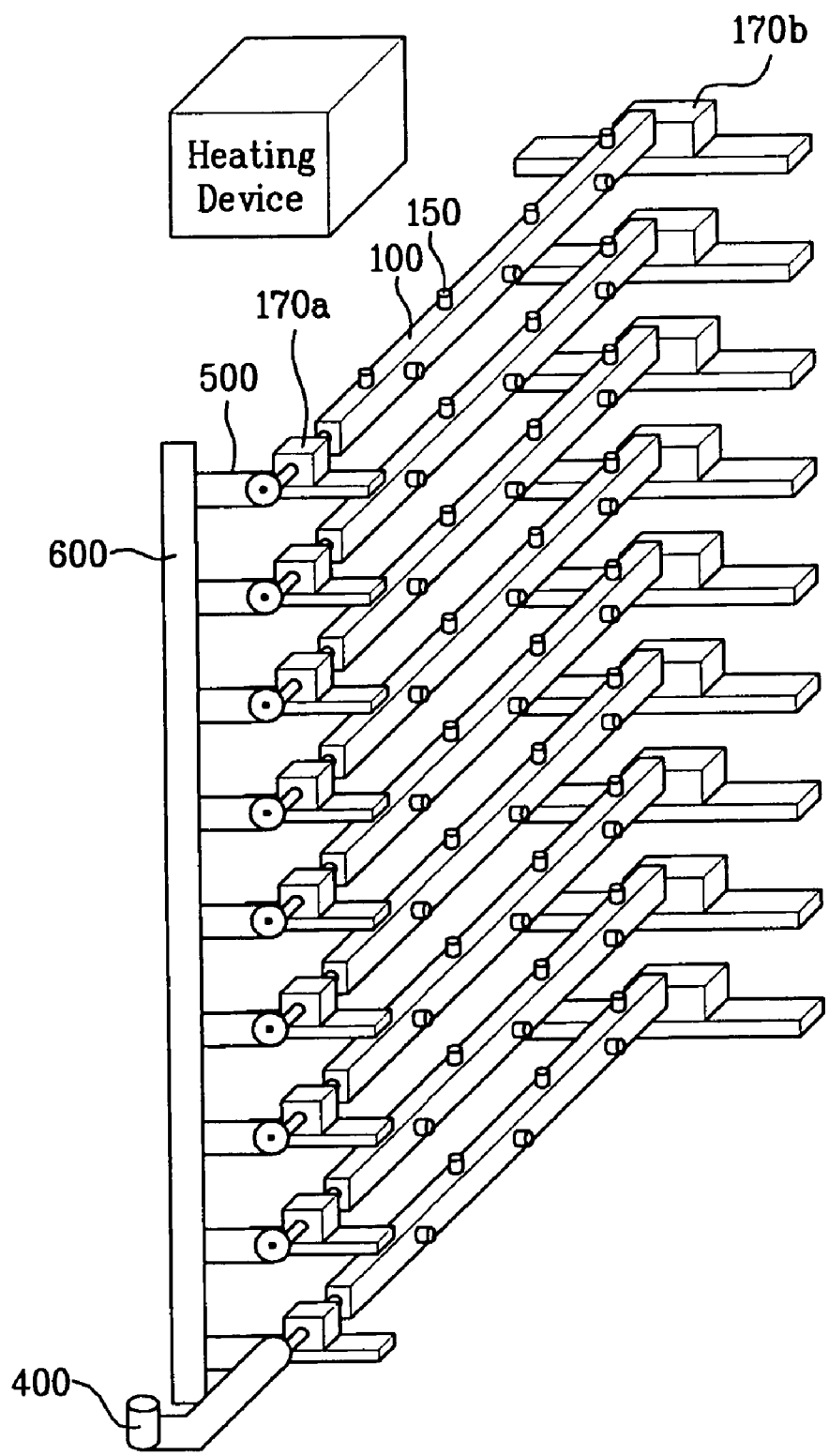
FIG. 7 is a perspective view illustrating a heat curing device according to the fourth embodiment of the present invention.

FIG. 7 is a perspective view illustrating a heat curing device according to a fourth embodiment of the present invention. The heat curing device shown in FIG. 7 employs links 500 and a link bar 600 to rotate the multi-staged supports 100 simultaneously.

As shown in FIG. 7, the heat curing device according to the fourth embodiment of the present invention includes multi-staged supports 100, protrusion structures 150 formed on each support 100, a plurality of links 500 respectively connected with the multi-staged supports 100, a link bar 600 connected with the links 500, and a grip 400 connected with at least one of the links 500.

Since the supports 100 and the protrusion structures 150 are identical to those of the first embodiment, their description will be omitted.

The links 500 are connected with the supports 100 and to a link bar 600. At least one of the links 500 is connected to the grip 400.

When the grip 400 is rotated, a link 500 connected to the grip 400 is also rotated. When any one of the links 500 is rotated, the link bar 600 connected with the rotated link 500 is also rotated. Rotation of the link bar 600 causes rotation of all of the links 500. As each of the links 500 is rotated, the respective support connected with the link 500 is rotated. As a result, all the supports 100 are rotated by rotation of the grip 400, and the pattern of the protrusion structures 150 formed on a polygonal section of the supports 100 and positioned to support a substrate can readily be varied. The link bar 600 transmits the rotation applied using the grip 400 to each link 500, and synchronizes the rotation of the links 500 and the supports 100 so that the supports 100 rotate simultaneously.

In FIG. 7, a grip 400 is illustrated as the means for rotating a link. Alternatively, a motor may be connected to at least one of the links 500 to serve as the means for rotating a link. Through the link and link bar structure, all of the links may be rotated by rotation of the motor, thereby rotating the supports 100 simultaneously.

The heat curing device includes a chamber receiving the supports 100 provided with the protrusion structures 150, and a heating device for increasing a temperature in the chamber.

Figure 8:
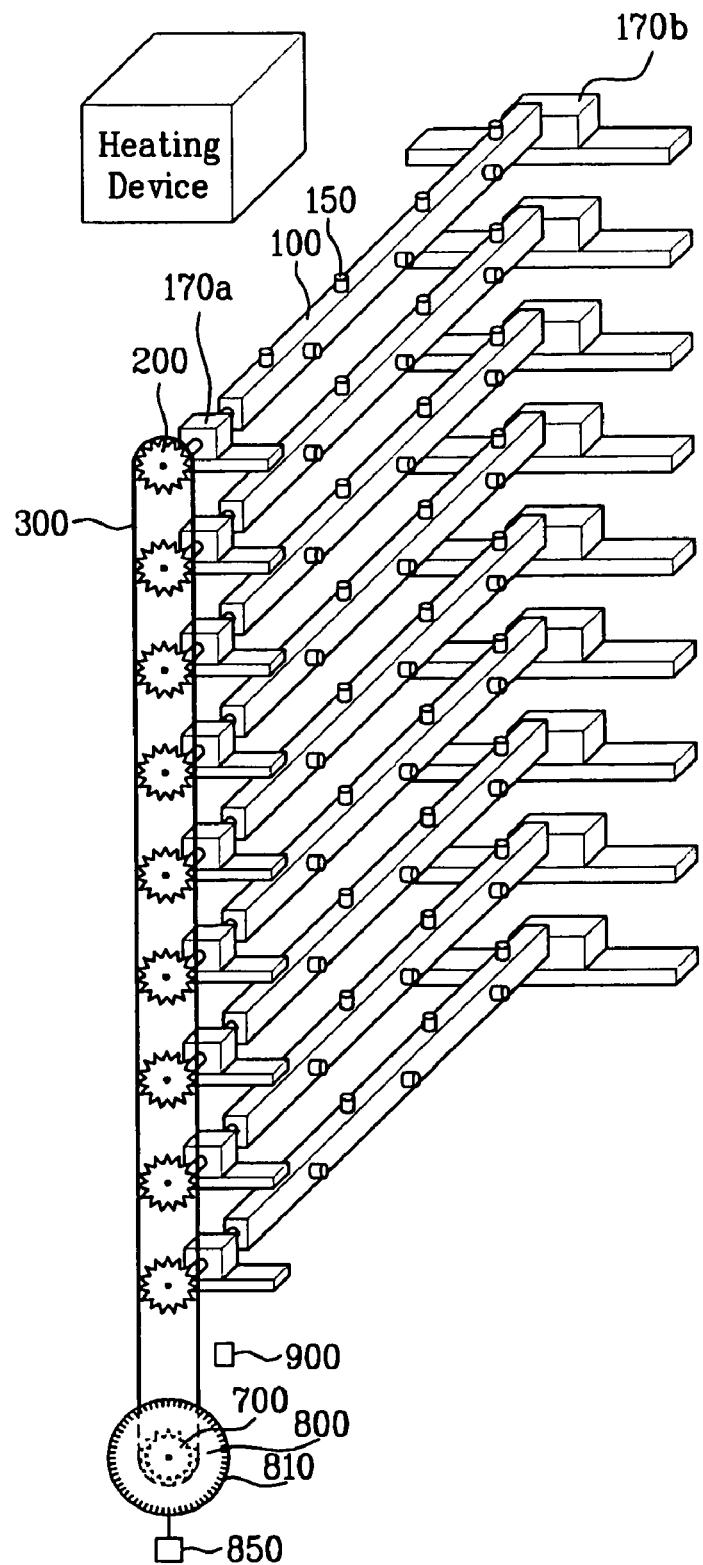
FIG. 8 is a perspective view illustrating a heat curing device according to the fifth embodiment of the present invention.

FIG. 8 is a perspective view illustrating a heat curing device according to a fifth embodiment of the present invention. Unlike the heat curing device shown in FIG. 4 in which the supports are rotated by rotation of the grip, the heat curing device shown in FIG. 8 is structured to automatically rotate all the supports using rotation supplied by a motor.

The detailed description of elements of the heat curing device according to the fifth embodiment of the present invention that are the same as those of the heat curing device according to the first embodiment of the present invention will be omitted.

In the heat curing device according to the fifth embodiment of the present invention, a belt 300 is rotated by a motor 700, and each of the gears 200 is rotated by rotation of the belt 300. In addition, each of the supports 100 is rotated by rotation of a respective gear 200. As a result, all the supports 100 are rotated using rotation supplied by the motor 700.

When a support 100 is rotated by rotation of the motor 700, the support 100 is rotated by the proper amount only when the proper amount of rotation is supplied by the motor 700. When the support is not rotated through the proper angle, the protrusion structures 150 formed on the supports 100 are not properly positioned in dummy areas of a liquid crystal cell to support the substrate without causing damage to the liquid crystal cell.

Therefore, a position sensor plate 800 may be formed at the front or rear of the motor to indicate the amount of rotational produced by the motor 700. A scale 810 is formed on the position sensor plate 800 indicates the rotational position of the support 100, allowing the rotational amount of the motor 700 to be adjusted in accordance with the indication on the scale 810.

Meanwhile, if the scale 810 of the position sensor plate 800 is not adjusted accurately, the rotational amount of the motor 700 cannot be accurately indicated or controlled. A sensor 850 may be additionally provided to detect misalignment of the origin of the position sensor plate 800 so that the position sensor plate 800 may be adjusted to provide an accurate indication of rotation of the motor.

In addition, when using a motor 700 to automatically rotate the supports 100, the belt 300 may fail to move for various reasons. A sensor 900 may be additionally provided to sense when the belt 300 fails to move when rotation is supplied by the motor.

2. Method of Fabricating LCD Device According to Embodiments of the Invention FIGS. 9A to 9C are views illustrating a method of fabricating an LCD device according to an embodiment of the present invention.

Figure 9A:
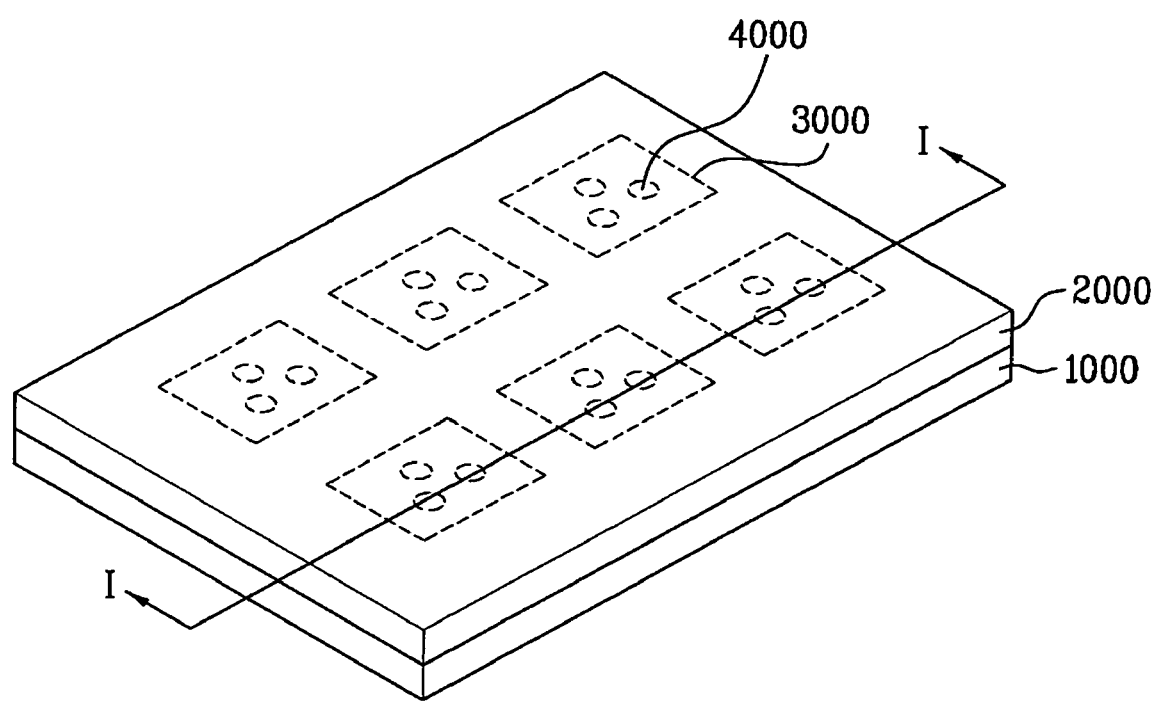
FIGS. 9A, 9B, and 9C are views illustrating a method of fabricating an LCD device according to the embodiment of the present invention.
Figure 9B:
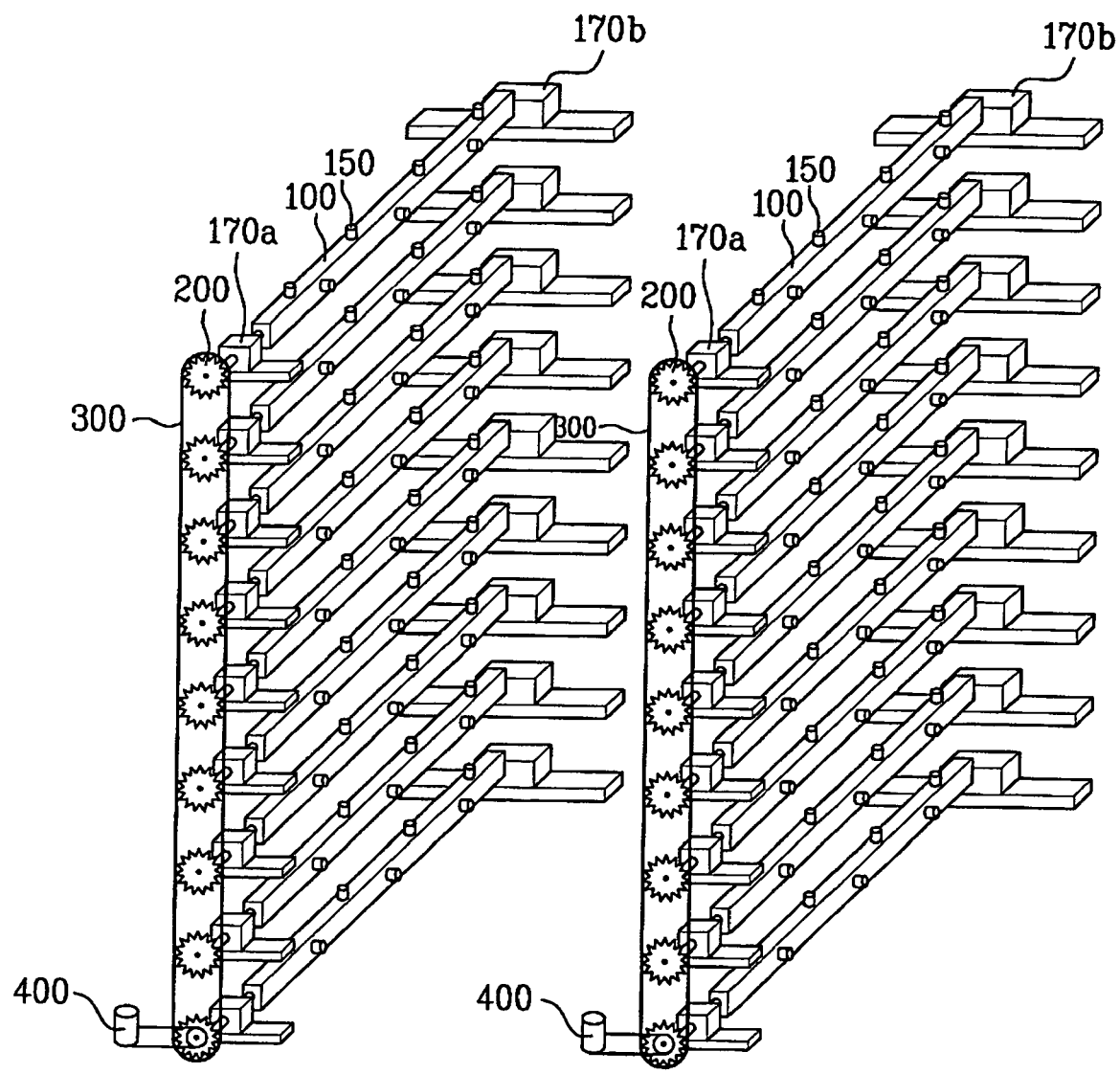
Figure 9C:
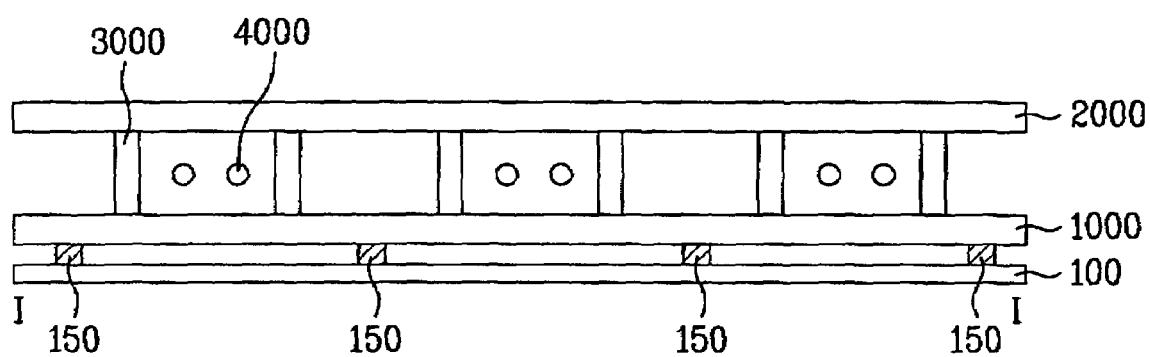

First, as shown in FIG. 9A, bonding substrates 1000 and 2000 are prepared. The bonding substrates 1000 and 2000 are provided with a plurality of liquid crystal cells in which a sealant 3000 is formed to seal the liquid crystal layer 4000 in the liquid crystal cells.

The bonding substrates are prepared by a first process of preparing first and second substrates 1000 and 2000, a second process of forming the sealant 3000 on at least one of the substrates 1000 and 2000, and a third process of bonding both substrates 1000 and 2000 while forming the liquid crystal layer 4000 in the sealant 3000.

The first process of preparing the first and second substrates 1000 and 2000 may be varied appropriately in accordance with a driving mode of the LCD device.

For example, when forming a twisted nematic (TN) mode LCD device, preparing the first substrate 1000 includes: forming a plurality of gate and data lines crossing each other to define pixel regions; forming a plurality of thin film transistors formed at crossing portions between the gate lines and the data lines to serve as switching elements; and forming a pixel electrode in each pixel region to serve as an electrode to produce an electric field. Preparing the second substrate 2000 includes: forming a light-shielding layer to prevent leakage of light; forming a color filter layer to display colors; and forming a common electrode to serve as an electrode to produce an electric field.

When forming an in plane switching (IPS) mode LCD device, preparing the first substrate 1000 includes: forming a plurality of gate and data lines crossing each other to define pixel regions; forming a plurality of thin film transistors formed at crossing portions between the gate lines and the data lines to serve as switching elements; and forming pixel and common electrodes formed in each pixel region to serve as a pair of electrodes to produce an electric field therebetween. Preparing the second substrate 2000 includes forming a light-shielding layer shielding leakage of light, and forming a color filter layer to display colors.

In the second process of forming the sealant 3000, the sealant 3000 may be formed with or without a liquid crystal injection hole using either a printing method or a dispensing method.

In the third process, the substrates 1000 and 2000 are bonded to each other with the sealant 3000, and either a liquid crystal injection method or a liquid crystal dropping method is used to form the liquid crystal layer 4000 within the sealant 3000.

In other words, the third process may be carried out using a liquid crystal dropping method in which after the liquid crystal layer 4000 is dropped onto one of the substrates 1000 and 2000, the substrates 1000 and 2000 are bonded to each other. Alternatively, the third process may be carried using a liquid crystal injection method in which after the substrates 1000 and 2000 are bonded to each other, the liquid crystal layer 4000 is injected within the sealant between the bonded substrates.

When carrying out the third process using the liquid crystal dropping method, the sealant 3000 is formed without a liquid crystal injection hole. When carrying out the third process using the liquid crystal injection method, the sealant 3000 is formed with a liquid crystal injection hole. The liquid crystal injection method requires a long time to inject the liquid crystal between large sized substrates, and the liquid crystal dropping method may be used with large sized substrates.

A process for preparing a heat curing device is will be described by referring to FIG. 9B.

Although the heat curing device shown in FIG. 9B is illustrate to be the heat curing device shown in FIG. 4, other embodiments of the heat curing device, such as the embodiments illustrated in FIGS. 5 to 8 and variations thereof may be used.

The heat curing device is prepared by rotating the supports 100 to allow the protrusion structures 150 on selected sections of the supports 100 to contact dummy areas between the respective liquid crystal cells.

The supports 100 can be rotated manually by use of the grip 400 or automatically such as by the motor 700.

A process of curing the sealant 3000 using UV rays may additionally be carried out before, during, or after the process of preparing the heat curing device.

Next, as shown in FIG. 9C, the sealant 3000 is cured after the bonded substrates 1000 and 2000 are loaded into the heat curing device.

FIG. 9C illustrates a section taken along line I-I of FIG. 9A. For convenience of illustration, FIG. 9C shows a pair of bonding substrates 1000 and 2000 and a single support 100.

After the heating device is prepared using the above described process, the bonded substrates 1000 and 2000 are loaded into the heat curing device in such a manner that one of the bonding substrates 1000 or 2000 is mounted on the protrusion structures 150 of the heat curing device. The protrusion structures 150 contact the dummy area between the liquid crystal cells of the respective substrate 1000 or 2000 to support the substrates 1000 and 2000 so that the sealant 3000 can be heat cured without causing damage to the liquid crystal cells.

The supports are described above as having a polygonal structure possessing a plurality of polygonal sections on which protrusion structures may be arranged. The supports sections may have structures other than polygonal. For example, the support sections may have substantially polygonal shapes having rounded corners or curved sides. Alternatively, the supports may have a curved cross-section such as a circular shaped cross section. When the support has a circular cross section, the protrusion structure patterns may be arranged on sections of the support spaced around the circumference of the support so that rotating the structure allows changing the protrusions structures pattern positioned to support a substrate.

In the embodiments described above, mechanical means such as belts and gears, and links with link bars are provided as the means for rotating the multi-stage supports and for synchronizing the rotation of the multi-stage supports. Other mechanical arrangements may be used with the invention. For example, each support may be provided with gears for rotating the support, and a set of interoperating gears that couple rotation between the support gears may be provided as the means rotating and synchronizing the rotation of the supports.

Alternatively, electrical means may be provided for rotating and synchronizing the rotation of the supports. For example, stepper motors may be connected to each support to rotate the supports, and a-common stepper signal provided to the stepper motors may provide the means for synchronizing the rotation of the supports. Using this approach, the supports in a single heat curing device may be rotated independently of one another to accommodate substrates having different arrangements of dummy areas at the same time within the heat curing device.

As described above, the heat curing device and the method of fabricating an LCD device using the same according to the present invention have the following advantages.

The supports are formed to have a shape such as a polygonal structure and a plurality of protrusion structures are formed on sections of the supports, so that a plurality of protrusion structure patterns can be formed on one support. Since the supports may be rotated, the protrusion structure patterns contacting and supporting a substrate may be readily changed.

Therefore, if a plurality of substrates, each including different sized liquid crystal cells is to be supported, the protrusion structure patterns can be selected appropriately in accordance with the size of the liquid crystal cell simply by rotating the supports. The heating device can be configured to support a changed size of a liquid crystal cell without a standby period, reducing process time.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A heat curing device comprising:
   a plurality of supports positioned to support a substrate, each of the supports rotatable about a horizontal axis;
   one or more protrusion structures formed on respective sections on the surface of each support arranged to contact a dummy area of the substrate; and
   a plurality of wheels connected to a belt and each of the supports so that the supports are simultaneously rotatable by rotating one or more of the wheels.

2. A method of fabricating an LCD device, comprising:
   preparing bonding substrates having a plurality of liquid crystal cells and provided with a liquid crystal layer and a sealant;
   preparing a heat curing device; and
   curing the sealant after loading the bonding substrates in the heat curing device,
   wherein the heat curing device includes at least two support positioned to support a substrate,
   protrusion structures formed on sections of the supports contact a dummy area of the substrate, wherein the at least two supports are rotatable with respect to a horizontal plane; and
   a plurality of wheels connected to a belt and each of the supports so that the supports are simultaneously rotatable by rotating one or more of the wheels.

3. The method of claim 2, wherein the at least two supports have polygonal sections.

4. The method of claim 2, wherein the sections of the supports are circular.

5. The method as claimed in claim 2, wherein preparing the heat curing device includes rotating the at least two supports to contact protrusion structures of the heat curing device with the dummy area between the liquid crystal cells.

6. The method as claimed in claim 5, wherein rotating the at least two supports includes manually rotating the support using a grip.

7. The method as claimed in claim 5, wherein rotating the at least two supports includes automatically rotating the at least two supports using a motor.

8. The method as claimed in claim 2, wherein preparing the bonding substrates includes:
   preparing first and second substrates;
   forming the sealant on at least one of the substrates; and
   bonding the substrates to each other while forming the liquid crystal layer.

9. The method as claimed in claim 8, wherein bonding the substrates to each other while forming the liquid crystal layer includes:
   dropping the liquid crystal layer on at least one of the substrates; and
   bonding the substrates to each other.

10. The method as claimed in claim 8, wherein preparing the bonding substrates while forming the liquid crystal layer includes:
    bonding the substrates to each other; and
    injecting the liquid crystal layer between the bonding substrates.

11. The method as claimed in claim 2, wherein loading the bonding substrates in the heat curing device includes mounting the bonding substrates on the protrusion structures to contact the protrusion structures with the dummy area between the liquid crystal cells.

12. The method as claimed in claim 2, further comprising UV curing the sealant before preparing the heat curing device.

13. The method as claimed in claim 2, wherein the at least two supports are positioned between a lower portion and an upper portion of the heat curing device.

14. The method as claimed in claim 2, wherein the heat curing device further includes a rotatable grip connected to one or more of the plurality of wheels to simultaneously rotate the plurality of wheels.

15. The method as claimed in claim 2, wherein the heat curing device further includes first auxiliary wheels connected with an inside surface of a loop of the belt.

16. The method as claimed in claim 2, wherein the heat curing device further includes second auxiliary wheels connected with an outside surface of a loop of the belt.

17. The method as claimed in claim 2, wherein the wheels are rotatable simultaneously by driving a motor connected with the belt.

18. The method as claimed in claim 17, wherein the heat curing device further includes a position sensor plate at the front or rear of the motor to indicate the rotational amount of the motor.

19. The method as claimed in claim 18, wherein the heat curing device further includes a sensor to indicate the origin of the position sensor plate.

20. The method as claimed in claim 17, wherein the heat curing device s further includes a sensor to sensing whether the belt rotated by the motor has any error.

21. The method as claimed in claim 2, wherein each of the supports are connected with a respective link in a plurality of links to rotate the respective support, each link of the plurality connected to a link bar to simultaneously rotate the plurality of links.

22. The method as claimed in claim 21, wherein the links are simultaneously rotatable by rotating a grip connected with at least one of the links.

23. The method as claimed in claim 21, wherein the links are simultaneously rotatable by driving a motor connected to at least one of the links.

24. The method as claimed in claim 22, wherein the sections of the supports have a rectangular shape.

25. The method as claimed in claim 3, wherein the protrusion structures are formed on all the polygonal sections of the supports.

26. The method as claimed in claim 2, wherein the heat curing device further defines a chamber receiving the at least two supports provided with the protrusion structures.

27. The method as claimed in claim 26, wherein the heat curing device further includes a heating device for increasing a temperature in the chamber.

28. The method as claimed in claim 27, wherein the at least two supports are arranged in a row in the chamber to support the substrate.

* * * * *